United States Patent
Melton

(10) Patent No.: US 9,414,700 B2
(45) Date of Patent: Aug. 16, 2016

(54) INSULATED DOUBLE WALLED DRINKING VESSEL AND METHOD OF MAKING THE SAME

(71) Applicant: Tervis Tumbler Company, North Venice, FL (US)

(72) Inventor: Thomas Melton, Englewood, FL (US)

(73) Assignee: Tervis Tumbler Company, North Venice, FL (US)

( * ) Notice: Subject to any disclaimer, the term of this patent is extended or adjusted under 35 U.S.C. 154(b) by 0 days.

(21) Appl. No.: 14/665,223

(22) Filed: Mar. 23, 2015

(65) Prior Publication Data

US 2015/0297006 A1    Oct. 22, 2015

Related U.S. Application Data

(60) Provisional application No. 61/982,439, filed on Apr. 22, 2014.

(51) Int. Cl.
*A47G 19/22* (2006.01)
*B29C 45/00* (2006.01)
(Continued)

(52) U.S. Cl.
CPC ........ *A47G 19/2288* (2013.01); *A47G 19/2205* (2013.01); *A47G 19/2227* (2013.01); *B29C 45/0062* (2013.01); *A47G 2400/10* (2013.01); *B29C 45/1657* (2013.01); *B29C 2045/1659* (2013.01); *B29L 2031/7132* (2013.01)

(58) Field of Classification Search
CPC .... B65D 11/16; B65D 81/3869; B65D 11/02; B29C 65/70; B29C 65/42; B29C 66/341; A47G 19/2205; A47G 19/2288; A47G 19/2227; A47G 19/22; A47G 2400/10

USPC ........ 220/592.17, 592.2, 62.12, 662; 264/248
See application file for complete search history.

(56) References Cited

U.S. PATENT DOCUMENTS

| 2,715,326 | A | | 8/1955 | Gits | |
| 3,002,646 | A | * | 10/1961 | Lewis | B65D 1/265 |
| | | | | | 220/62.11 |
| 3,247,302 | A | | 4/1966 | Lewis | |

(Continued)

FOREIGN PATENT DOCUMENTS

| DE | 202005001019 U1 | 3/2006 |
| GB | 959341 A | 5/1964 |
| GB | 1021252 A | 3/1966 |

OTHER PUBLICATIONS

English language abstract for DE 20 2005 001 019 U1 (2006).
(Continued)

*Primary Examiner* — J. Gregory Pickett
*Assistant Examiner* — Blaine Neway
(74) *Attorney, Agent, or Firm* — Caesar Rivise, PC

(57) ABSTRACT

An insulated drinking vessel, e.g., a tumbler, and method of making the same is disclosed. The vessel basically comprises a pre-molded inner vessel formed of a plastic material having a sidewall is disposed within a pre-molded outer vessel formed of a plastic material having a sidewall to form a subassembly having an insulating air space between the sidewalls. A ring of plastic material is molded in-situ on top portions of the inner and outer vessels of the subassembly to cause portions of the plastic material of the inner and outer vessels to melt and intermingle with the plastic material of the ring to form a non-superficial homogenous joint. The ring forms the rim or lip of the insulated drinking vessel.

8 Claims, 2 Drawing Sheets

(51) Int. Cl.
  *B29L 31/00* (2006.01)
  *B29C 45/16* (2006.01)

(56) References Cited

U.S. PATENT DOCUMENTS

| | | | |
|---|---|---|---|
| 3,458,619 A | 7/1969 | Prochaska |
| 4,872,569 A | 10/1989 | Bolte |
| 5,090,213 A | 2/1992 | Glassman |
| 5,553,735 A | 9/1996 | Kimura |
| 5,839,599 A | 11/1998 | Lin |
| 6,050,443 A | 4/2000 | Tung |
| 6,405,892 B1 | 6/2002 | Volan |
| 6,419,108 B1 | 7/2002 | Toida et al. |
| 6,921,179 B2 | 7/2005 | Diak Ghanem |
| D519,785 S | 5/2006 | Bodum |
| D526,848 S | 8/2006 | Bodum |
| D557,561 S | 12/2007 | Flowers et al. |
| 7,306,113 B2 | 12/2007 | El-Saden et al. |
| 2004/0212120 A1 | 10/2004 | Giraud |
| 2005/0045643 A1 | 3/2005 | Ghanem |
| 2005/0173365 A1 | 8/2005 | McKnight |
| 2005/0194340 A1 | 9/2005 | Huang |

OTHER PUBLICATIONS

International Search Report of PCT Application No. PCT/US2015/022148, dated Jul. 24, 2015.

\* cited by examiner

INSULATED DOUBLE WALLED DRINKING VESSEL AND METHOD OF MAKING THE SAME

CROSS-REFERENCE TO RELATED APPLICATIONS

This utility application claims the benefit under 35 U.S.C. §119(e) of Provisional Application Ser. No. 61/982,439 filed on Apr. 22, 2014 entitled INSULATED DOUBLE WALLED DRINKING VESSEL AND METHOD OF MAKING THE SAME. The entire disclosure of this provisional application is incorporated by reference herein.

FIELD OF THE INVENTION

This invention relates generally to drinking vessels and more particularly to insulated drinking vessels having a thin rim and methods of making the same.

BACKGROUND OF THE INVENTION

Double walled insulated drinking vessels are commercially available from various vendors. There are also numerous U.S. Patents and published patent applications directed to doubled walled insulated drinking vessels, such as glasses, mugs, goblets, wine glasses and the like. See for example, U.S. Patents and published applications: U.S. Pat. No. 4,872,569 (Bolte); U.S. Pat. No. 5,090,213 (Glassman); U.S. Pat. No. 5,553,735 (Kimura); U.S. Pat. No. 5,839,599 (Lin); U.S. Pat. No. 6,050,443 (Tung et al.); U.S. Pat. No. 6,405,892 (Volan); U.S. Pat. No. 6,419,108 (Toida et al.); U.S. Pat. No. 6,921,179 (Ghanem); U.S. Pat. No. 7,306,113 (El-Saden et al.); D519,785 (Bodum); D526,848 (Bodum); D557,561 (Flowers et al.); 2004/0212120 (Giraud); 2005/0045643 (Ghanem); 2005/0173365 (McKnight); and 2005/0194340 (Huang).

While the insulated drinking vessels of the foregoing prior art may be generally suitable for their intended purposes, a need exists for drinking vessel which has a thin, but relatively long, drinking lip. The subject invention addresses that need by providing an insulated drinking vessel and method of making it. The drinking vessel is formed of a pre-molded inner vessel disposed within a pre-molded outer vessel and whose top portions are joined together by in-situ molding a plastic ring thereon to produce a non-superficial homogeneous joint.

SUMMARY OF THE INVENTION

In accordance with one aspect of this invention an insulated drinking vessel is provided. The insulated drinking vessel comprises an inner vessel, an outer vessel, and a ring. The inner vessel, the outer vessel and the ring are each formed of a plastic material, e.g., a transparent copolyester. The inner vessel is pre-molded and includes a top edge portion. The outer vessel is also pre-molded and also includes a top edge portion. The pre-molded inner vessel is disposed within the pre-molded outer vessel with the top edge portion of the pre-molded inner vessel disposed adjacent the top edge portion of the pre-molded outer vessel. The ring is molded in-situ on the top edge portions of the pre-molded inner and outer vessels to cause the plastic material thereof to fuse together and intermingle with the plastic material of the ring to form a non-superficial homogenous joint. The ring forms the lip of the insulated drinking vessel.

In accordance with one preferred aspect of this invention the top edge portion of one of the pre-molded inner and outer vessels comprises an annular flange and wherein the top edge portion of the other of the pre-molded inner and outer vessels includes an annular recess for receipt of the annular flange.

In accordance with one preferred aspect of this invention the ring is thin and relatively long, and may be optionally colored, while the inner and outer vessels are transparent. A decorative item may be located within the insulating air space.

Another aspect of this invention constitutes methods of making an insulated double walled drinking vessel. For example, one method of this invention entails making an insulated drinking vessel by providing a pre-molded inner vessel formed of a plastic material and having a top edge portion. A pre-molded outer vessel formed of a plastic material and having a top edge portion is also provided. The pre-molded inner vessel is disposed within the pre-molded outer vessel so that the top edge portion of the inner vessel is disposed adjacent the top edge portion of the outer vessel. A ring of plastic material is then molded in-situ on the top edge portions of the pre-molded inner and outer vessels to cause the plastic material thereof to fuse together and intermingle with the plastic material of the ring to form a non-superficial homogenous joint.

DETAILED DESCRIPTION OF THE PREFERRED EMBODIMENT

Figure 1:
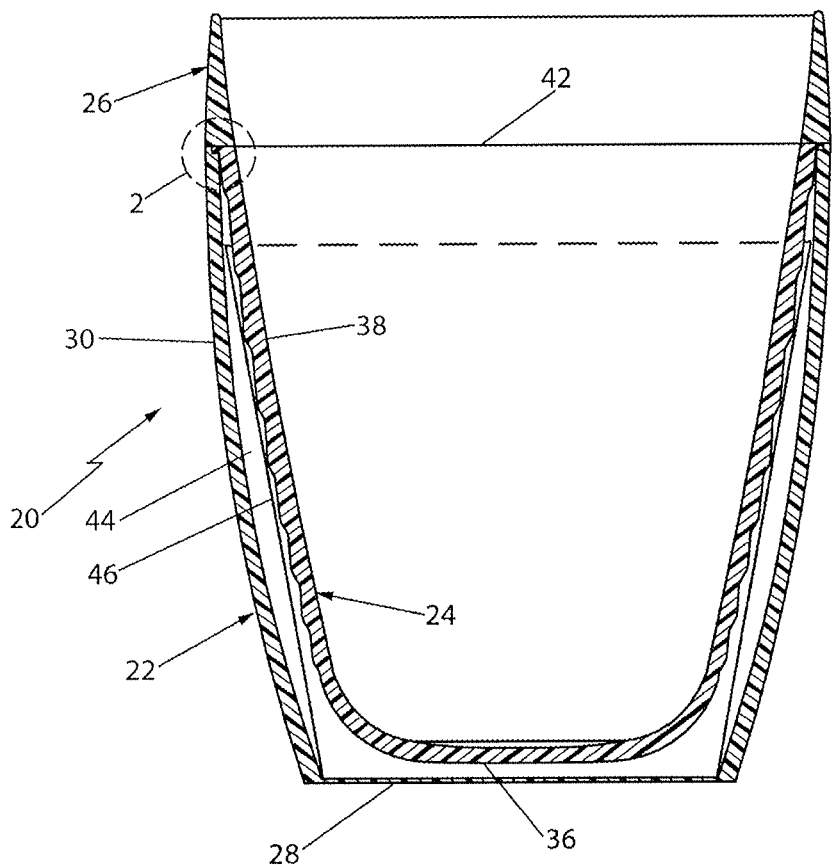
FIG. 1 is vertical sectional view of one exemplary insulated drinking vessel, e.g., a tumbler, constructed in accordance with one aspect of this invention.

Referring now to the various figures of the drawing wherein like reference characters refer to like parts, there is shown at 20 in FIG. 1 one exemplary embodiment of an insulated drinking vessel, e.g., a tumbler, constructed in accordance with this invention. The tumbler 20 basically comprises an outer vessel 22, an inner vessel 24, and a ring 26. The outer vessel 22 is an integral unit that is molded of any suitable transparent plastic material, e.g., Eastman Tritan™ copolyester sold by Eastman Chemical Company. Any suitable conventional molding technique, e.g., blow molding, injection molding, etc., can be used to form the outer vessel. What is important is that the outer vessel is a pre-molded component, i.e., is made prior to its use in the assembly of the vessel 20. The inner vessel 24 is also an integral unit that is also pre-molded of any suitable plastic material using any suitable conventional molding technique. In accordance with one preferred aspect of this invention the material making up the inner vessel is the same material as that of the outer vessel, e.g., Eastman Tritan™ copolyester.

The rim or lip of the insulated vessel 20 is formed by the ring 26. To that end, the ring is molded in-situ on the top surfaces of the inner and outer vessel in accordance with a method of this invention. That method will be described in detail later. Suffice it for now to state that the pre-molded inner vessel is disposed within the pre-molded outer vessel to form a subassembly which can then be placed within an injection molding machine (not shown), with the top surface 32 of a portion of the outer vessel 22 and the top surface of a portion of the inner vessel 24 in communication with a ring shaped mold cavity (not shown) in the injection molding machine. The ring shaped mold cavity is of any suitable thickness and height to form the rim or lip of a drinking vessel, e.g., it may have a thickness in the range of approximately 0.125 inch to 1.0 inch, and a height in the range of approximately 0.0625 inch to 2.0 inch. A molten plastic material, preferably the same material as that from which the outer and inner vessels were pre-molded, is injected under pressure into the mold cavity to fill the ring shaped portion of the cavity and thereby form the ring 26. Moreover, and quite significantly, the molten injected plastic forming the ring 26 also engages the exposed top surfaces of the outer and inner vessels to cause those surfaces to melt and reflow to a substantial depth, e.g., within the range of approximately 0.003 inch-0.100 inch (preferably within the range of approximately 0.030 inch-0.080) inch, whereupon the injected plastic intermingles with the melted plastic of the outer and inner vessels, to form a non-superficial homogenous joint thereat, thereby integrally joining the two vessels to the in-situ molded ring. The resulting molded unit is then allowed to cool to the point at which it can be removed from the injection molding machine and allowed to cool completely, whereupon the resulting molded unit exhibits the same properties as if it had been molded as an integral unit at one time, e.g., it exhibits the same resistance to breakage or other damage at the location of the joint as remainder of the unit.

Figure 2:
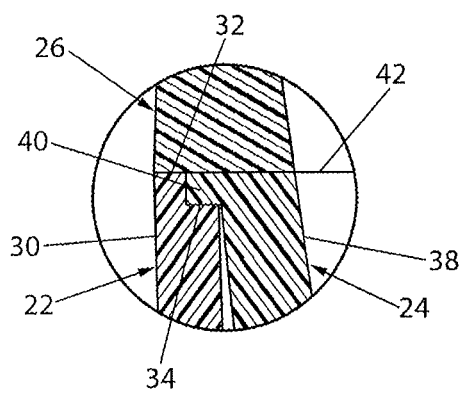
FIG. 2 is an enlarged sectional view of the portion of the insulated drinking vessel shown within the circle designated as 2 in FIG. 1.

As best seen in FIGS. 1 and 2, the outer vessel 22 includes a base wall 28 and a sidewall 30. The sidewall 30 is a surface of revolution and can be of any desired shape. In the exemplary embodiment it is shown as being slightly arcuate. As best seen in FIG. 2 the upper end of the sidewall 30 has a top surface 32 which includes an undercut annular recess or shelf 34. The shelf is arranged to receive a portion of an annular flange 40 of the inner vessel 24. The inner vessel 24 also includes a base wall 36 and a sidewall 38. The sidewall 38 is also a surface of revolution and can be of any desired shape. In the exemplary embodiment it is shown as being very slightly arcuate. The upper end of the sidewall 38 is in the form of the heretofore identified annular flange 40. The flange 40 has a top surface 42.

With the inner vessel disposed within the outer vessel, a peripheral portion of the flange 40 is received within the shelf 34, such as shown in FIG. 2, to form the subassembly that is arranged to be placed into the injection molding machine so that the ring 26 can be molded in-situ on the top portion of thereof as mentioned above.

It should be pointed out at this juncture, that the size of the shelf 34 and the size of the flange 40 are selected, so that when the pre-molded outer vessel with the pre-molded inner vessel within it is placed into the injection molding machine and pressure is applied to that subassembly a good fluid-tight pressure seal results at the interface of the shelf and flange. To that end, the outside diameter of the mold cavity which forms the ring 26 is chosen to be slightly larger, e.g., 0.40" than the outside diameter of the outer vessel, whereupon when pressure is applied to the outer vessel by the injection molding machine to form the fluid-tight seal between the flange of the inner vessel and the shelf of the outer vessel, the outer surface of the outer vessel will be flush with the outer surface of the ring 26 molded in-situ on the vessels. Moreover, the thickness of the flange and the depth of the shelf are selected to be greater than the depth that the plastic material of the inner and outer vessels will melt and reflow when the ring 26 is molded in-situ on those vessels to prevent the extant injection pressure and heat during the in-situ molding process from compromising the seal between the inner vessel and the outer vessel. Thus, for example, if the homogenous joint created by the in-situ molding of the ring on the vessels is to be in the preferred range of 0.030 inch-0.080 inch, the thickness of the flange and the depth of the recess should be at least 0.060 inch. Further still, the outside edge of the outer vessel should have a shutoff area that will create a homogenous seal that will not allow liquid the wick into the joint.

When the inner vessel 24 is disposed as just described within the outer vessel 22, the outer surface of the sidewall 38 of the inner vessel 24 is spaced from the inner surface of the sidewall 30 of the outer vessel 22 to form an insulating air space 44 therebetween. If desired, an optional, decorative item, e.g., a wrap, an embroidered emblem or patch, etc., can be disposed in the air space prior to the in-situ molding of the ring on those vessels to provide enhanced aesthetics for the vessel 20. In the exemplary embodiment shown in FIG. 1, the decorative item comprises a wrap 46. Irrespective of the construction of the decorative item, since it is disposed within the air space 44 and the sidewall of the outer vessel 22 is transparent, it will be visible through the transparent sidewalls 30 to provide enhanced aesthetics to the insulated vessel 20. Moreover, in the interest of aesthetics, the material forming the ring 26 may be colored to accentuate the rim and to coordinate with the ornamentation provided by the decorative item with in the insulated air space. For example, the decorative item within the air space may be a wrap or embroidered patch bearing a college logo in the college's colors, with the ring being colored to match one of the college's colors for emphasis.

Inasmuch as the ring 24 is molded in-situ on the outer and inner vessels, it is a simple matter to provide other structural features to the ring as it is molded in-situ on the vessels 22 and 24. For example, if desired a helical thread may be provided on the outer surface of the ring 26 to accommodate a threaded cap or lid for the insulated vessel 20. To that end, the mold cavity in which the ring is molded in-situ may include helical thread forming portion contiguous with the portion of the cavity forming the outer surface of the ring. Alternatively, the ring may be formed with an internal helical thread for a cap or lid. In such a case, the mold cavity may include helical thread forming portion contiguous with the portion of the cavity forming the inner surface of the ring. Other features can be molded into the ring during its formation, e.g., the top edge of the ring may include a portion of elevated height to form an enlarged lip for facilitating the drinking of a beverage from the vessel. A straw holder, not shown, may also be formed in the ring as the ring is molded in-situ on the vessels 22 and 24.

Figure 3:
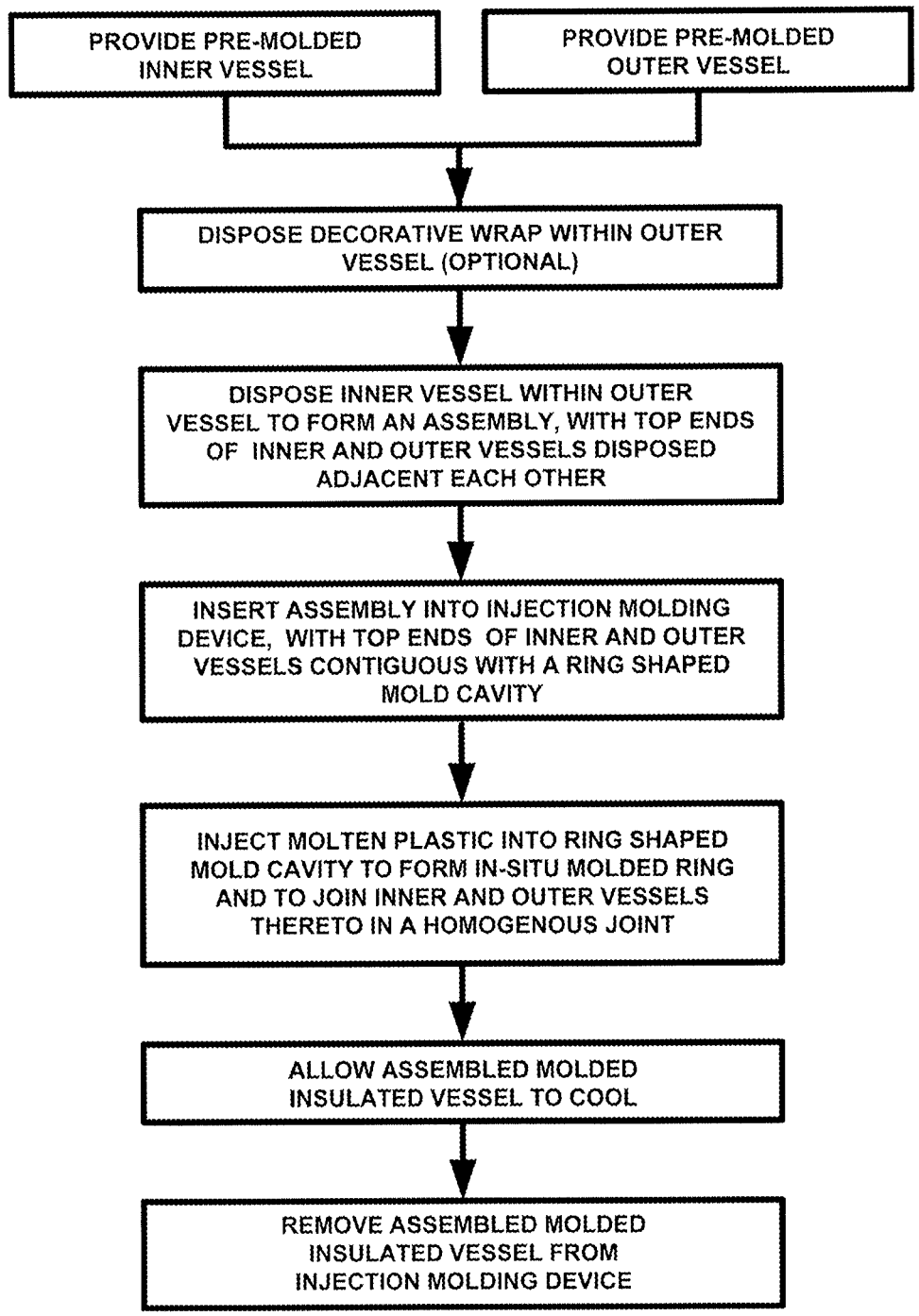
FIG. 3 is a block diagram of one exemplary method in accordance with this invention for making an insulated vessel, such as the insulated vessel shown in FIG. 1.

As mentioned above the method of making the insulated tumble 20 (or any other double walled insulated drinking vessel constructed in accordance with this invention) constitutes another aspect of this invention. To that end, as best seen in FIG. 3, the method entails providing a pre-molded inner vessel formed of a plastic material. That inner vessel is constructed as discussed earlier, e.g., it has a top edge portion and an annular flange. A pre-molded outer vessel formed of a plastic material is also provided. The outer vessel is also constructed as discussed earlier, e.g., it has a top edge portion and an annular recess or shelf. The pre-molded inner vessel is disposed within the pre-molded outer vessel to form a subassembly, with the top edge portion of the inner vessel is disposed adjacent the top edge portion of the outer vessel, e.g., a peripheral portion of the annular flange of the inner vessel disposed within the annular shelf of the outer vessel.

The subassembly is then inserted into an injection molding machine so that the subassembly is at the base of the injection molding machine's cavity contiguous with the portion of the ring-shaped mold cavity for forming the ring. The geometry of the molding machine cavity is such that a leak proof seal is created around the outside of the outer vessel 22, and a leak proof seal is created inside the inner vessel 24 when the mold is closed. This is accomplished by making the portion of the cavity that the outer vessel is nested in of a smaller diameter by at least 0.004 inch than the outer diameter of the portion of the cavity forming the outer surface of the ring. Moreover, it is desirable to have the mold cavity produce a land length of at least 0.060 inch and the inner core to have a diameter larger than the seal area of the inner by at least 0.004 inch and a land length of at least 0.060 inch.

The ring 26 is then molded in-situ on the top edge portions of the pre-molded inner and outer vessels, whereupon the heat and pressure applied causes the plastic material forming the ring to fuse together and intermingle with the re-flow (melted) plastic material of the inner and outer vessels to form a non-superficial homogenous joint and with the ring having outer surface that is flush with the outer surface of the outer vessel and an inner surface that is flush with the inner surface of the inner vessel. Moreover, the gating of the ring should be placed in such a way as to give maximum heat to the re-flow area. Thus, it is preferably located as close to the inner and outer re-flow area as possible. The parameters of the injection molding process are set in a way to create enough shear heat to re-flow the top surfaces of the inner vessel and outer vessel to form the non-superficial homogeneous joint. For example, in accordance with one exemplary process of this invention, barrel heats are set to a range between 530-560 degrees F. and pack and hold cavity pressures are between approximately 10,000 PSI to 12,000 PSI.

After the in-situ molding process is complete, the assembled/molded insulated vessel 20 is allowed to cool within the injection machine until the molten plastic has solidified sufficiently that the vessel can be removed. That completes the vessel 20. Another vessel can then be made in the injection molding machine in a similar manner as just described.

It should be pointed out at this juncture that the structure of the insulated drinking vessel and method or making it as described above are merely exemplary of various structures and methods that are contemplated by this invention. Thus, for example, the insulated vessel 20 of this invention is not limited to tumblers, and may be in the form of mugs, wine glasses, bottles, etc. Moreover, the sidewall portions of the vessels may be of other shapes and sizes than that shown in the drawing. What is important is that the upper rim of the vessel is molded in-situ on the pre-molded outer and inner vessels to produce a thin upper lip or rim formed of a single sidewall, while a substantial portion of the remainder of the insulated vessel below the ring is insulated via a double wall construction.

Without further elaboration the foregoing will so fully illustrate my invention that others may, by applying current or future knowledge, adopt the same for use under various conditions of service.

I claim:

1. An insulated drinking vessel comprising an inner vessel, an outer vessel, and a ring, said inner vessel, said outer vessel and said ring each being formed of a plastic material, said inner vessel being pre-molded and including an inner surface and a top edge portion, said top edge portion of said inner vessel comprising an outwardly-facing annular flange, said outer vessel being pre-molded and including an outer surface and a top edge portion, said top edge portion of said outer vessel comprising an inwardly-facing annular recess, said pre-molded inner vessel being disposed within said pre-molded outer vessel with said outwardly-facing annular flange disposed within said inwardly-facing annular recess to support said inner vessel within said outer vessel without any other means of support and with said top edge portion of said pre-molded inner vessel forming a common flat top surface with said top edge portion of said pre-molded outer vessel, said ring being molded in-situ on said common flat top surface to cause the plastic material thereof to fuse together and intermingle with said plastic material of said ring to form a non-superficial homogenous joint, said ring having an outer surface flush with said outer surface of said outer vessel, said ring having an inner surface flush with said inner surface of said inner vessel, said ring forming the lip of said drinking vessel.

2. The insulated drinking vessel of claim 1 wherein said plastic material of said pre-molded inner vessel, said pre-molded outer vessel and said ring is the same plastic material.

3. The insulated drinking vessel of claim 2 wherein said plastic material comprises copolyester.

4. The insulated drinking vessel of claim 1 wherein said pre-molded inner vessel, said pre-molded outer vessel and said ring are transparent.

5. The insulated drinking vessel of claim 1 wherein said pre-molded inner vessel and said pre-molded outer vessel are transparent and wherein said ring is colored.

6. The insulated drinking vessel of claim 1 wherein said ring includes a top free edge, and wherein the thickness of said ring tapers downward in thickness in a direction from said pre-molded inner and outer vessels toward said top free edge.

7. The insulated drinking vessel of claim 1 wherein said pre-molded inner vessel includes a sidewall and wherein said pre-molded outer vessel comprises a sidewall, and wherein portions of said sidewall of said pre-molded inner vessel are spaced from portions of said sidewall of said pre-molded outer vessel to form an insulating air space therebetween.

8. The insulated drinking vessel of claim 7 wherein said sidewall of said outer member is transparent and wherein said drinking vessel additionally comprising a decorative member disposed within said insulating air space and visible through said transparent sidewall.

* * * * *